United States Patent [19]
Hoeberigs

[11] Patent Number: 5,315,919
[45] Date of Patent: May 31, 1994

[54] ARRANGEMENT FOR FRYING OR WARMING ARTICLES OF FOOD

[75] Inventor: Rudolf Hoeberigs, Knokke-Heist, Belgium

[73] Assignee: Jean M. M. Hoeberigs, Netherlands

[21] Appl. No.: 761,964

[22] PCT Filed: Aug. 2, 1991

[86] PCT No.: PCT/BE91/00054
§ 371 Date: Feb. 11, 1992
§ 102(e) Date: Feb. 11, 1992

[87] PCT Pub. No.: WO92/02166
PCT Pub. Date: Feb. 20, 1992

[30] Foreign Application Priority Data
Aug. 7, 1990 [BE] Belgium .............. BE09000773

[51] Int. Cl.$^5$ .............................................. A47J 37/00
[52] U.S. Cl. ........................................ 99/357; 99/327;
99/407; 99/451; 99/476; 99/483; 219/214;
219/400; 221/82; 221/150 A; 221/203
[58] Field of Search .............. 99/357, 326, 348, 327,
99/427, 334, 407, 335, 409, 451, 476, 483, DIG.
14; 219/214, 400; 126/21 A; 221/150 A, 150
HC, 150 R, 82, 83, 96, 203; 366/231, 607

[56] References Cited

U.S. PATENT DOCUMENTS

| | | | |
|---|---|---|---|
| 1,150,211 | 8/1915 | Lawhead | 99/357 |
| 1,834,353 | 12/1931 | Shoudy | 219/400 |
| 2,371,316 | 3/1945 | Rice et al. | |
| 2,966,573 | 12/1960 | Hansen | 219/400 |
| 2,975,527 | 3/1961 | Bushway | 99/476 |
| 4,426,793 | 1/1984 | Kuboyama | 219/400 |
| 4,499,818 | 2/1985 | Strong | 99/483 |
| 4,503,627 | 3/1985 | Schumacher | 99/483 |
| 4,574,980 | 3/1986 | Kurosawa et al. | |
| 4,722,267 | 2/1988 | Galockin et al. | 99/357 |
| 4,838,445 | 6/1989 | Hoeberigs | |
| 4,922,812 | 5/1990 | Schweinfurth | 99/485 |
| 4,998,464 | 3/1991 | Kubacki | 99/348 |
| 5,144,879 | 9/1992 | Alessi | 99/357 |

FOREIGN PATENT DOCUMENTS

| | | |
|---|---|---|
| 2143222 | 2/1985 | European Pat. Off. |
| 8802517 | 4/1988 | Fed. Rep. of Germany |
| WO86/07648 | 12/1986 | PCT Int'l Appl. |
| WO89/10085 | 11/1989 | PCT Int'l Appl. |
| WO89/12417 | 12/1989 | PCT Int'l Appl. |
| 9112756 | 9/1991 | PCT Int'l Appl. ............ 99/476 |

*Primary Examiner*—Timothy F. Simone
*Attorney, Agent, or Firm*—Nixon & Vanderhye

[57] ABSTRACT

An arrangement (1) is provided for the frying or warming of articles of food (24) which mainly comprise loose parts with respect to each other. The arrangement (1) comprises a recipient (3) wherein the articles of food (24) may be introduced. This recipient (3) comprises a bottom (4) which may be subjected to a rotation around a central, oblique axis (6). The bottom (4) comprises separate segments (41–46) which are separated from each other, at least a part of the bottom (4) of each segment (41–46) being jointable to empty the fried of warmed articles of food. The arrangement (1) may receive, fry or warm, and deliver separate portions of articles of food (24).

6 Claims, 2 Drawing Sheets

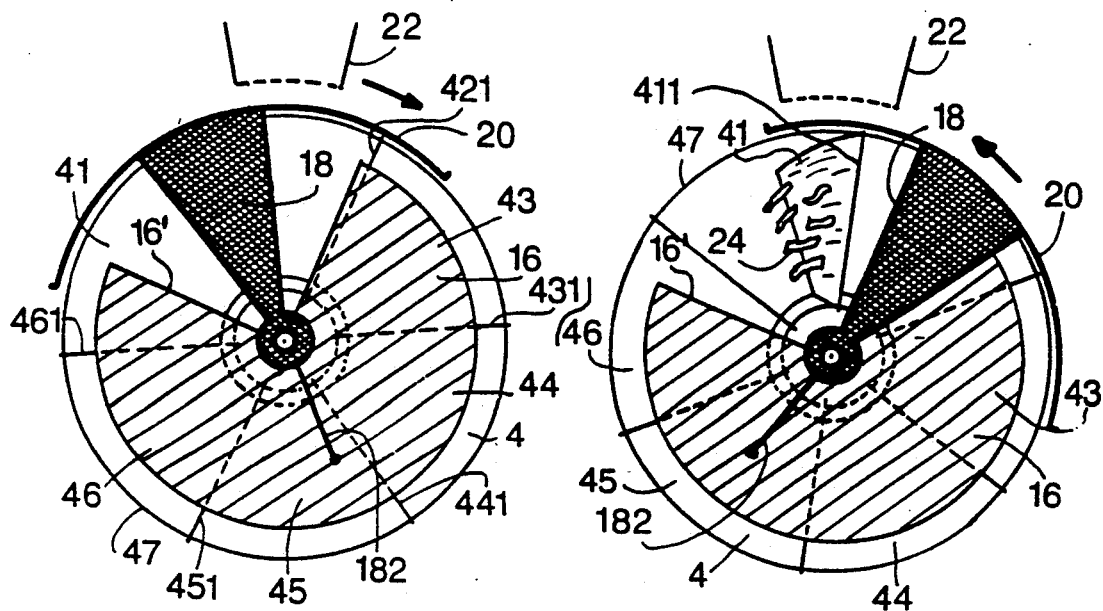
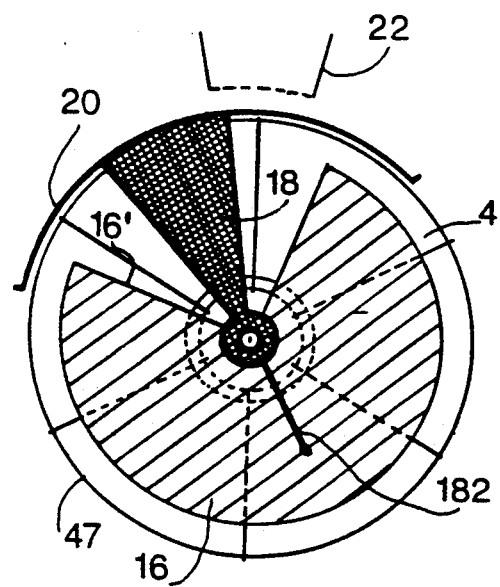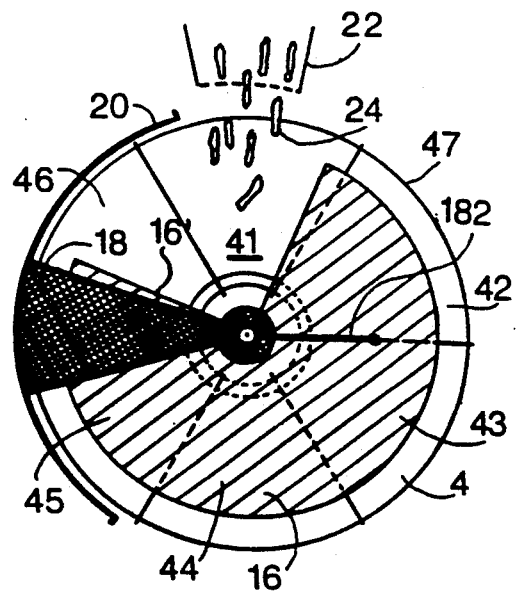

ARRANGEMENT FOR FRYING OR WARMING ARTICLES OF FOOD

FIELD OF THE INVENTION

The invention relates to an arrangement for the frying or warming of articles of food which mainly comprise small parts which are loose with regard to each other. Examples of such articles of food are french fries, chips, little potato balls, croquettes, bake ware and similar.

DESCRIPTION OF THE PRIOR ART

With the arrangement according to the invention the articles of food have already fried beforehand and/or are provided with a small coating of fat; frying or warming according to the invention is done by means of infrared and/or hot air.

Such an arrangement is known from patent application WO-A-86/07648. The articles of food are fried or warmed in a receptacle which rotates around a vertical axis. Organs hang in the receptacle and take care that the articles of food are continuously in movement. The receptacle, however, must make a downward movement before being filled with articles of food and in order to be emptied the receptacle must make a downward movement and a rotation around a horizontal axis. Hence the filling and emptying requires a complex mechanism which harms the compactness of the arrangement.

A similar arrangement is further known from patent application WO-A-89/10085. Here the receptacle rotates around an oblique axis. The bottom of the receptacle is provided with roughnesses which take care for the continuous movement of the articles of food. The filling of the arrangement is done rather simply by means of a funnel and a blockable slide. This funnel and slide are above the obliquely arranged recipient. This increases the distance between heating elements and the articles of food and harms the thermal efficiency of the arrangement. On the other hand, a—although limited—rotation of the receptacle is still necessary for the emptying of the receptacle. This rotation is further only possible for a limited dimension of the receptacle. If the receptacle is greater, it has to make a downward movement before rotation can start. This complicates the required mechanism and harms the compactness. Another drawback is that when the receptacle returns to the frying position after emptying, the partitions of the receptacle must form a good shutting off with the bell-glass, otherwise hot air gets lost during frying or heating. Such a shutting off is not always easy to realize.

Still another drawback of the above-mentioned arrangements according to the state of the art is that the arrangements are only suited to fry or to warm one determined quantity of articles of food each turn. If one wishes to fry or to warm a greater quantity, more frying or warming turns are necessary.

SUMMARY OF THE INVENTION

It is an object of the invention to avoid the above drawbacks.

The present invention provides an arrangement for frying or warming articles of food which mainly comprise small parts which are loose with regard to each other. The arrangement comprises a receptacle where the articles of food may be introduced. This receptacle comprises a bottom which may be subjected to a rotation around a central, oblique axis. The bottom comprises separate segments which are separated from each other. At least a part of the bottom of each segment is jointed for pivotal movement into an open condition to empty the fried or warmed articles of food.

The advantage of such an arrangement is that the arrangement may receive, warm or fry and deliver separate portions. The maximum number of portions which may be treated simultaneously is equal to the number of segments. But it is also possible to treat a smaller number of portions.

According to a preferable embodiment of the invention, the arrangement is further provided with a stationary plate and with at least one bottom cut off valve. The stationary plate is underneath the bottom and comprises at least one recess which allows the pivoting of the bottom each segment. The bottom of cut off valve is also underneath the bottom, is rotatable around the central axis and is able to prohibit the pivoting of a segment if the bottom cut off valve is at the level of the recess.

An example of method of working is as follows: The stationary plate comprises one recess. During the frying or warming the bottom cut off valve is situated at the level of the recess and, as a consequence, the bottoms of each segment cannot pivot. The bottom cut off valve prohibits the pivoting. During the frying or warming the motor which drives the bottom, rotates at a relatively high speed. After frying or warming the motor switches to a relatively low speed and the bottom cut off valve rotates so as to open the recess. The subsequent segments are preselected one after another above the recess and thus pivot under the influence of their proper weight and the weight of the articles of food. The articles of food are thereby released. Each time a segment leaves the place above the recess, the bottom of the segment closes again and the segment may be refilled—if desired.

According to a particular embodiment of the invention the arrangement is further provided with a supply main for filling the arrangement with articles of food. A partition which is perpendicular with respect to the bottom, is fixedly connected to the radial extremity of the bottom cut off valve in such a way that the partition may cut off the supply main while frying or warming and while emptying of a determined segment, and may free the supply main at other times This embodiment has as an advantage that a determined segment may be emptied and subsequently filled in one and the same position by means of very simple means of carrying out, without the bottom having to rotate between the emptying and the filling. For that purpose the bottom cut off valve only has to take three different positions:

(1) During the frying, or warming the,,.bottom cut off valve is at a position to block the recess in the stationary plate. The partition fixedly connected to the bottom cut off valve cuts off the main supply.

(2) After frying or warming the bottom cut off valve unblocks the recess, but the partition still cuts off the main supply. The segment may thus now be emptied but not yet filled.

(3) After emptying of the segment, the bottom cut off valve closes the bottom of the segment is moved and into a third position whereby the partition releases the main supply. The segment may now be filled without being able to pivot into its open condition.

BRIEF DESCRIPTION OF THE DRAWINGS

The invention will be further illustrated on the basis of the figures whereby

FIG. 2(a) to (d) show the working of a bottom cut off valve and a partition which is fixedly connected to the bottom cut off valve of a preferable embodiment of an arrangement according to the invention;

DESCRIPTION OF THE PREFERRED EMBODIMENT

Figure 1:
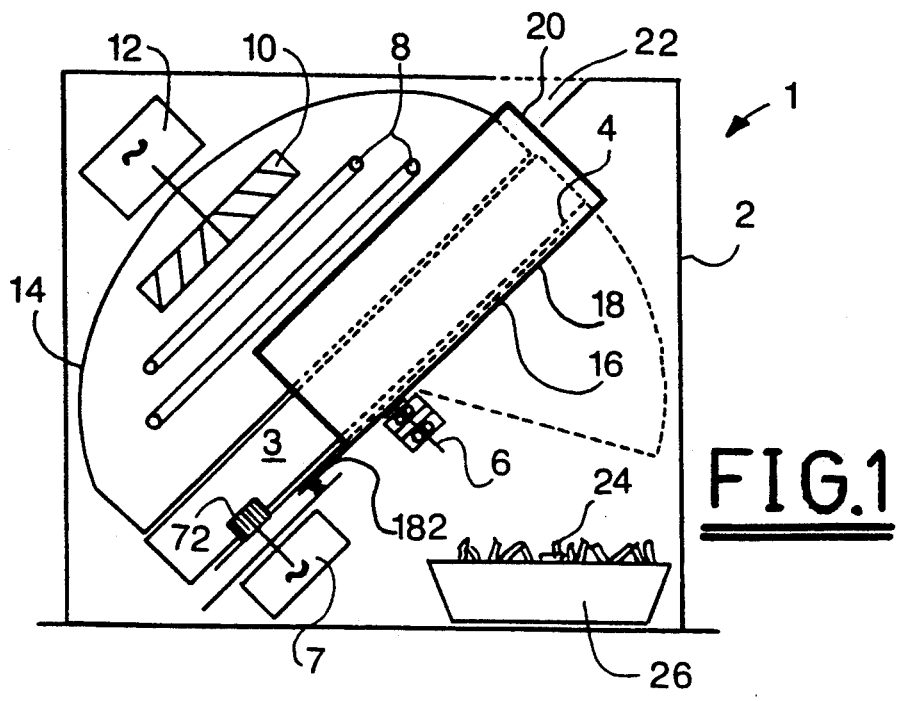
FIG. 1 shows a front side of a preferable embodiment of an arrangement according to the invention.

Referring to FIG. 1 a preferable embodiment of the arrangement 1 for the frying or warming of articles of food is in a housing 2. The articles of food lie in a receptacle 3 to be warmed or to be fried. The bottom 4 of the receptacle 3 is rotatable around a central oblique axis 6. The angle this central axis 6 makes with respect to a vertical line is dependent upon the kind of articles of food : preferably 30° for croquettes, 45° for french fries and 60° for fine bake ware. The lighter the article of food, the greater the inclination.

The bottom has roughnesses (not shown) which are provided in such a way that the articles of food may at least partially roll over these roughnesses. Preferably the roughnesses are ribs which extend substantially radially over at least a part of the bottom 4. More details about this bottom may be find in the already mentioned application WO-A-89/10085.

A motor 7 acts upon the tooth engagements (not shown) of the bottom 4 by means of a toothed wheel 72 and makes the bottom 4 rotate. Two electric heating elements 8 are above the recipient 4. A ventilator 10 takes care of the circulation of the hot air above the heating elements 8. An electric motor drives the ventilator 10. A dome or glass-bell 14 covers the warming or frying capacity.

Further referring to FIG. 2 which shows a bottom view of the arrangement 1, the bottom is subdivided into six segments 41, 42, 43, 44, 45, 46. These segments are separated by means of raised partitions 411, 421, 431, 441, 451 and 461. A stationary plate 16 (hatched in one direction) defines a recess (not hatched and identified by reference numeral 16') is under the rotatable bottom 4. The surface area of the recess is greater than the surface area of one segment of the bottom. A rotatable bottom cut off valve 18 (doubly hatched) has been mounted under the stationary plate 18. A raised partition 20 has been fixedly connected to the radial extremity of this bottom cut off valve 18. The partition 20 is perpendicularly situated with respect to the bottom 4.

Articles of food 24 may be filled up by way of a supply main 22. The emptying of the articles of food is done by the pivoting of a segment 41–46 of the bottom in the recess of the stationary plate 16. This is preferably done when the relevant segment is in the uppermost position as illustrated by means of the dotted lines on FIG. 1. In this way, a very compact embodiment of the arrangement 1 is possible.

The operation is as follows :

FIG. 2(a) shows the position of the bottom cut off valve 18 in the rest position or during the frying or warming. The bottom cut off valve is resisted with and thus blocks the recess 161. The partition 20 cuts off the supply main 22 so that the circulation of hot air and/or the infrared heating has a direct effect on the articles of food to be fried and such that no energy gets lost by way of the supply main 22.

During the clockwise rotation of the bottom cut off valve 18 hand the recess 16' is unblocked by the valve 18 thereby allowing the segment 41 to pivotally fall open and the articles of food 24 fall in a small tray 26—see FIG. 2(b). The partition 20 still closes the supply main 22.

The clockwise rotation of the bottom cut off valve 18 is coupled with the rotation of the bottom 4, also in a clockwise direction. When the bottom cut off valve rotates in a counter-clockwise direction, the bottom 4 stands still.

Once the articles of food 24 have left the segment, the bottom cut off valve rotates in a counter-clockwise direction and cuts off the segment 41 of the bottom. FIG. 2(c) shows the position immediately after the closing of the segment. The partition 20, however, still cuts off the supply main 22.

FIG. 2(d) shows eventually the extreme counter-clockwise position of the bottom cut off valve 18. At such a position, the partition 20 opens for the first time the supply main 22. As a consequence, the segment 41 which has just been emptied, may be filled now with articles of food 24 which are to be fried or to be warmed.

As illustrated on FIG. 1, the movement of the bottom cut off valve 18 is possible by the fact that the same electric motor 7 which drives the bottom 4, engages a handle 182 of the bottom cut off valve 18. The motor 7 takes care of the movement of the bottom cut off valve 18 between the three different positions which have been described hereabove.

Preferably a bake time mechanism (not shown) which cooperates synchronously with the rotation of the bottom 4 is provided. The six-segments-oven may fry or warm one to six portions at will simultaneously or with intervals. Therefore the drive mechanism is provided with six identification points (not shown) which cooperate with six time switches. A supply mechanism for the articles of food also cooperates with the time switches in such a way that the relevant time switch is switched on while entering the articles of food. At the end of the warming or frying period this switch has the bottom cut off valve work again exactly on the point of time that the relevant segment comes above the recess. Since the baking time—for that segment—has expired, the same time switch indicates that the same segment is empty so that the supply mechanism for the bake wares—if desired—may put immediately into the segment a new portion of articles of food and that the time switch may be put in working again. This applies, independently of one another, for each segment of the bottom.

The advantage of the preferable embodiment which has been described hereabove is that the emptying and the filling of a segment is done without having to move the segment.

Figure 3:
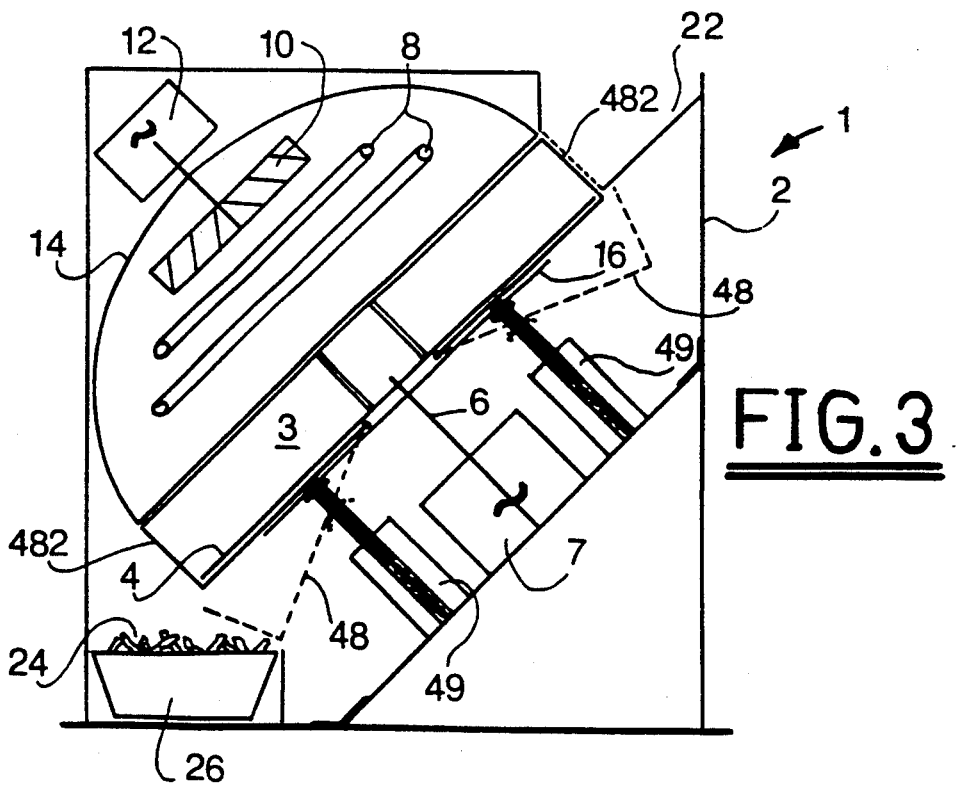
FIG. 3 shows an alternative embodiment of an arrangement according to the invention.

FIG. 3 represents an alternative embodiment of an arrangement according to the invention. Under the uneven bottom 4 which has also been divided into segments there is a jointed bottom 48 with a side partition 482 and thereunder a stationary plate 16 with two recesses. The recesses are facing one another over 180°, one in the lowest part and one in the highest part. The emptying of a segment is done in the lowest part : An electromagnet 49 draws the relevant segment of the jointed bottom 48 open (see dotted lines) and the articles of food 24 fall in a small tray 26. The filling of the segment is done in the highest part : For that purpose another electromagnet 49 draws the relevant segment of the jointing bottom 48 open in such a way that the raised partition 482 releases the supply main 22. A drawback with regard to the preferable embodiment described hereabove is that an emptied segment cannot be refilled immediately. The segment has first to be rotated over 180°. This requires a more complicated automaton.

The invention may be applied to a warming or frying installation which may comprise two or more arrangements as here described. These arrangements may be separately switched on and off. In this way one has a modular system which is very flexible in use and which may warm or fry different ranges of portions simultaneously. The different arrangements may have one common oblique axis or they may have each their own separate oblique axis.

I claim:

1. An arrangement for frying or warming loose articles of food comprising:
   a receptacle for receiving said articles of food, said receptacle having a bottom which is disposed at and rotatable about a central oblique angle;
   a heating element for warming or frying the articles of food received by said receptacle, wherein
   said bottom includes a number of separate segments, each segment being jointed so as to be pivotal individually under its own weight between a closed condition, wherein the loose articles of food are retained in said receptacle, and an open condition wherein the loose articles of food are allowed to be discharged from said receptacle.

2. An arrangement according to claim 1, further comprising;
   a stationary plate positioned below said bottom and defining at least one recess which allows a selected one of said segments to pivot into said open condition thereof; and
   at least one bottom cut-off valve which is rotatable about said central oblique angle between a (i) a first position which blocks said defined recess of said stationary plate to thereby prevent said selected one of said segments form pivoting into said open condition thereof, and (i) a second position which unblocks said defined recess and thereby allows said selected one of said segments to pivot into said open condition thereof, whereby said articles of food may be discharged from said receptacle.

3. An arrangement according to claim 2, further comprising:
   a supply main for filling said receptacle with articles of food; and
   a partition which is disposed perpendicular with respect to the bottom and fixedly connected to a radial extremity of the bottom cut-off valve such that said partition cuts off said supply main when said cut-off valve is in said first and second positions; and wherein
   said cut-off valve is rotatable into a third position in which said partition opens said supply main to allow the filling of said receptacle with articles of food.

4. An arrangement for heating loose food articles comprising a receptacle for receiving loose food articles to be heated, and a heating element for heating the loose food articles within the receptacle; wherein said receptacle includes:
   a bottom wall which is rotatable about a central axis and is comprised of a number of separate jointed segments, each of which is capable of pivotal movements between a closed condition where the loose food articles are maintained within said receptacle, and an open condition where the loose food articles are allowed to be discharged from said receptacle;
   a stationary plate adjacent to said bottom wall which defines a recess through which an individual one of said segments can be pivotally moved; and
   a cut-off valve which is rotatable about said central axis between (i) a first position wherein said recess of said stationary plate is blocked to thereby prevent an individual one of said segments from pivotally moving into said open condition thereof, and (ii) a second position wherein said recess of said stationary plate is unblocked to thereby allow said individual one of said segments to pivot into said open condition thereof, whereby said heated food articles are discharged from said receptacle.

5. An arrangement as in claim 4, which further includes a supply main for supplying said receptacle with said loose food articles, and a partition member which is disposed at a radial extremity of said cut-off valve so as to close said supply main when said cut-off valve is in said first and second positions, and wherein said cut-off valve is further rotatable into a third position where said partition member opens said supply main and allows food articles to be supplied to said receptacle.

6. An arrangement as in claim 4, wherein rotatable movement of said cut-off valve from said second position and into said first position causes said individual one of said segments to pivotally move from said open condition and into said closed condition thereof.

* * * * *